United States Patent [19]

Anderson et al.

[11] Patent Number: 4,829,647

[45] Date of Patent: May 16, 1989

[54] METHOD OF MAKING LOW FRICTION FINGER FOLLOWER ROCKER ARMS

[75] Inventors: Anthony T. Anderson, Romulus; Nathaniel L. Field, Northville, both of Mich.

[73] Assignee: Ford Motor Company, Dearborn, Mich.

[21] Appl. No.: 132,740

[22] Filed: Dec. 14, 1987

[51] Int. Cl.$^4$ .............................................. B23P 15/00
[52] U.S. Cl. ............................. 29/156.4 R; 29/441.1; 29/515; 123/90.39
[58] Field of Search .................. 29/156.4 R, 441, 505, 29/515, 558, 557; 123/90.39, 90.44; 74/559

[56] References Cited

U.S. PATENT DOCUMENTS

| | | | |
|---|---|---|---|
| 4,430,783 | 2/1984 | Wherry | 29/156.4 R |
| 4,674,453 | 6/1987 | Dove, Jr. | 29/156.4 R |
| 4,697,473 | 10/1987 | Patel | 29/156.4 R |

*Primary Examiner*—Howard N. Goldberg
*Assistant Examiner*—Irene Cuda
*Attorney, Agent, or Firm*—Joseph W. Malleck; Roger L. May

[57] ABSTRACT

A low friction finger follower rocker arm is fabricated by starting with a flat metal strip sheet stock section having a stamped configuration with a centralized opening being adapted to be bent later into a channel for such rocker arm. The shaping and hardening of the stock section is carried out prior to such bending. The method steps comprise the following: (a) while substantially in the flat condition (i) shaping the strip sheet stock section to have at least a pair of journal openings aligned on opposite sides of said centralized opening, a pivot surface at one end of the strip sheet stock section, a stud contacting surface at the other end of the strip sheet stock section, such surfaces being aligned with the centralized opening along a line transverse to the alignment of said journal openings, and a pair of grooves aligned with the extremities of the centralized opening and containing the surfaces therebetween, (ii) locally hardening the surfaces and the edges of the opposed openings; (b) bending the shaped strip sheet stock section along the grooves to form a partial channel having side walls with an included angle of no greater than 40° and with said journal openings approaching alignment on a common axis; and (c) inserting a journalized low friction wear assembly with its journals in said opposed journal openings, and then completing the bending of said strip sheet stock section so that the sides of the channel are substantially parallel and locking the wear assembly journals to the channel side walls.

10 Claims, 2 Drawing Sheets

METHOD OF MAKING LOW FRICTION FINGER FOLLOWER ROCKER ARMS

BACKGROUND OF THE INVENTION

1. Technical Field

This invention relates to the art of making stamped metal articles and, particularly, to the art of making stamped metal articles for use as rockers arms in internal combustion engines.

2. Description of the Prior Art

Low carbon stamped or cast steel rocker arms have been used heretofore. However, the sequence for forming such rocker arms has consistently included forming a channel of such metal to provide a strong structure which can withstand the forces to which such rocker arms are subjected, followed by shaping operations and chemical treatments. Shaping operations have included drilling, reaming, and threading; chemical treatments may include thermal baths, cyaniding and sulfur treatments. Joining of composite members or plys of the formed channel, such as by welding (see U.S. Pat. Nos. 3,418,985; 4,430,783), is also performed subsequent to channel formation. Such joining of laminated plys of the assembly may be by clamping and upsetting.

The problem associated with the above method steps is cost, which is held at a relatively high level because the life of the tools used to perform the shaping operation is low, the apparatus and sequential steps required for chemical treatment are expensive, and the extra steps required for the joining of plys or composites is added expense. But, most importantly, by employing a variety of shaping steps subsequent to the formation of the arm channel inhibits the speed of making the completed rocker arm and prevents such techniques from fitting well with "just in time" inventory techniques so prevalent in the emerging modern factory. Moreover, finger follower arms, which are a special type of rocker arm, are subjected to operational stresses, which must be considered in the arm design and in the past has limited the method of making. Such arm design must provide for higher strength and hardnesses which qualities, if present in the starting material, inhibits fabrication.

SUMMARY OF THE INVENTION

The invention is a method of making, and the resulting construction, for a low friction finger follower rocker arm. The starting material for the method is a flat strip stock section having a generally rectangular configuration with a centralized opening, to be bent later into a channel for such rocker arm. The shaping and hardening of the stock section is carried out prior to such bending. The method steps comprise the following: (a) while substantially in the flat condition (i) shaping the strip sheet stock section to have at least a pair of journal openings aligned on opposite sides of said centralized opening, a pivot surface at one end of the strip sheet stock section, a stud contacting surface at the other end of the strip sheet stock section, such surfaces being aligned with the centralized opening along a line transverse to the alignment of said journal openings, and a pair of grooves aligned with the extremities of the centralized opening and containing the surfaces therebetween, (ii) locally hardening the surfaces and the edges of the opposed openings; (b) bending the shaped strip sheet stock section along the grooves to form a partial channel having side walls with an included angle of no greater than 40° and with said journal openings approaching alignment on a common axis; and (c) inserting a journalized low friction wear assembly with its journals in said opposed journal openings, and then completing the bending of said strip sheet stock section so that the sides of the channel are substantially parallel and locking the wear assembly journals to the channel side walls.

Preferably, strip stock section used as a starting material is comprised of medium carbon steel stock which has been annealed and cold-rolled, and has a thickness in the range of 0.100–0.250 inches.

Advantageously, the shaping operations of step (a)(i) are carried out by piercing to define the journal openings with indented edges, coining to define the pivot surface and stud contacting surface, and embossing to define the parallel aligned grooves.

Preferably, the local hardening of step (a) (ii) is carried out by laser hardening. Advantageously, the low friction assembly is comprised of a needle roller bearing assembly having a pin shaft, the shaft being journalled in the opposed openings.

Generally, the time period required for carrying out the steps (a) through (c) should be less than about 10 minutes, resulting in cost savings.

DETAILED DESCRIPTION AND BEST MODE

Strip Sheet Stock

The method herein provides for rapid fabrication of stamped roller finger follower arms, which is defined herein to mean low friction roller follower assembly with a sheet metal housing. The starting material for the process of this invention comprises a strip sheet metal stock which advantageously will have a size configuration of about ⅛ inch thickness, a 3-inch longitudinal length, and a width of about 2.0 inches. The thickness may be ground to a precise dimension of 0.120 inches.

The material for the strip sheet stock is a medium carbon steel, SAE 40140-H strip sheet stock, which is annealed and cold-rolled. The medium carbon steel is required to facilitate the subsequent local hardening by laser of certain surfaces of the strip sheet stock section. Medium carbon steels have a carbon content in the range of 0.30-0.50% by weight.

Figure 1:
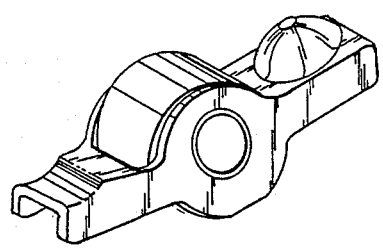
FIG. 1 is a perspective view of a finger follower rocker arm made by the process of this invention.
Figure 2:
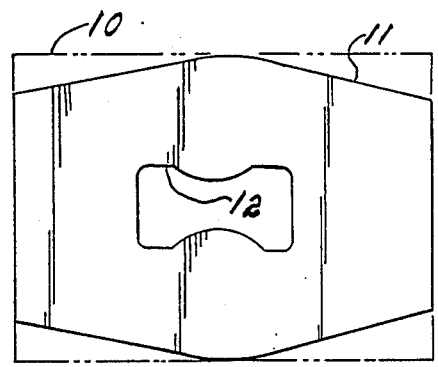
FIG. 2 is a plan view of a strip sheet stock section stamped to provide the starting material for the process of this invention.

The strip sheet stock is given a configuration 11 by stamping, as shown in FIG. 2, containing a centralized elongated opening 12.

Shaping

Figure 3:
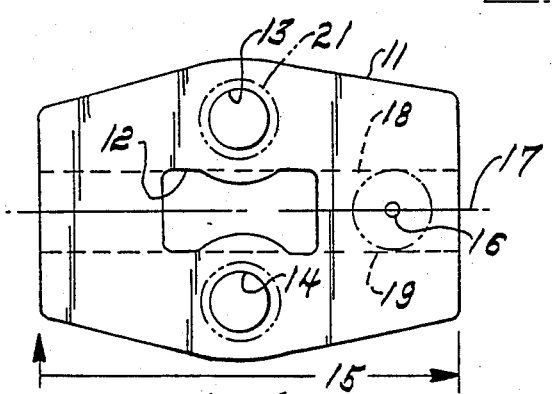
FIG. 3 is a plan view of the strip sheet stock section of FIG. 2 which has been subjected to the first shaping operation which includes piercing of openings and the indentation of the edges of certain of said openings.
Figure 4:
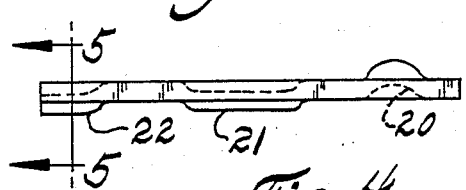
FIG. 4 is an elevational view of the strip sheet stock section which has been shaped by the second of the shaping operations, including coining of the shallow concave pivot surface and the stud contacting surface.
Figure 5:
FIG. 5 is a sectional view taken along line 5—5 of FIG. 4.
Figure 7:
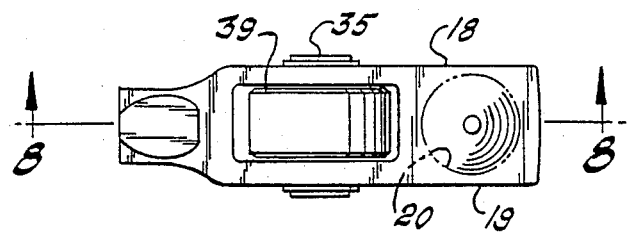
FIG. 7 is a plan view of the completed rocker arm assembly shown in FIG. 1.
Figures 8, 9, 10:
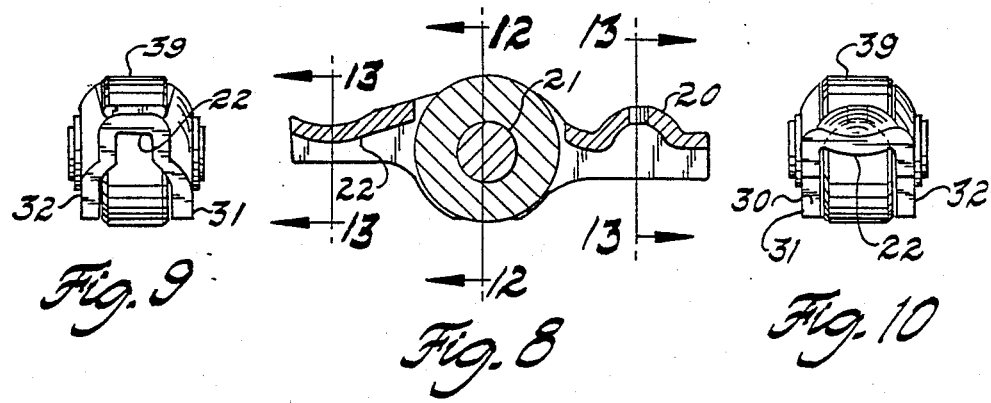
FIG. 8 is a sectional view taken along line 8—8 of FIG. 7.
FIG. 9 is an end elevational view of the structure in FIG. 8.
FIG. 10 is another elevational view of the structure in FIG. 8.
Figures 11, 12, 13:
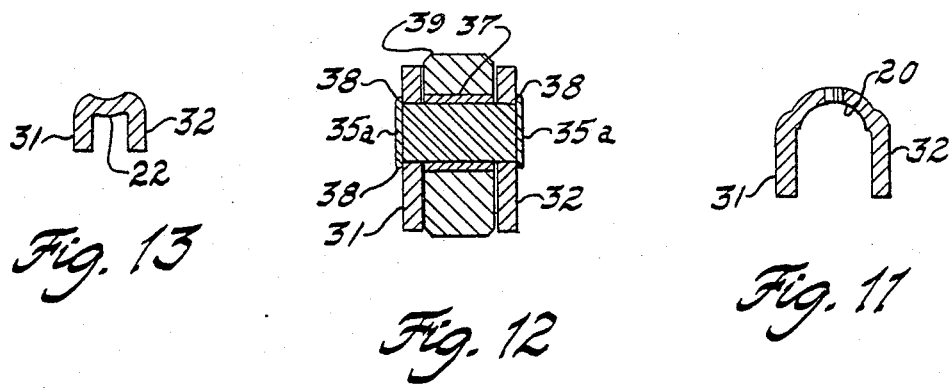
FIGS. 11 through 13 are respectively sectional views taken along lines 11—11, 12—12 and 13—13 of FIG. 8.

Referring to FIGS. 3, 4 and 5, the stamped strip sheet stock section 11 is subjected to shaping which includes piercing, embossing, coining, and trimming as required. Such operations may be carried out in a transfer press where, at a first station, a pair of journal openings 13 and 14 are defined on opposite sides of the centralized opening 12, that is, transverse to the longitudinal extent 15 of the strip sheet stock section. Advantageously, a small oil opening 16 is pierced in one end of the strip sheet stock section and is aligned with a plane 17 bisecting the section with the openings 13 and 14 on opposite sides. Simultaneous with this piercing operation at the first station, a pair of grooves 18 and 19 are embossed in a manner so that these grooves are parallelly aligned along the outer edges of the centralized opening 12 and extend generally parallel to the longitudinal centerline 17 of the strip sheet stock section. The grooves preferably have an embossed radius in the range of 0.010-0.050 inches; they facilitate subsequent bending of the substantially flat strip sheet stock section into a subsequent channel shape.

Next, at a second station of the transfer press, coining operations are carried out to define a shallow concave pivot surface 20 and indented shoulders 21 for the edges of the opposed journal openings.

Next, at a third station of the transfer press, the substantially flat strip sheet stock section is subjected to a blanking operation to define a stud contacting surface 22 at the opposite longitudinal end of the strip sheet stock section while simultaneously coining such stud contacting surface.

Optionally, at a fourth station of the transfer press, the substantially flat strip sheet stock section may be trimmed to remove offal or edge burns.

Local Hardening

Local hardening is advantageously carried out by the use of lasers in a manner as taught in U.S. Pat. No. 4,533,400 to a hardness level of about Rockwell C55. The local hardening is carried out along the indented shoulders 21 of the opposed journal openings 13 and 14 as well as along the entire shallow concave pivot surface 20 and the coined stud contacting surface 22. Laser hardening has certain advantages which include: little thermal distortion during heat treatment, minimal energy requirements for heat treating localized areas, and allows process to better meet just-in-time inventory controls.

Bending

Figure 6:
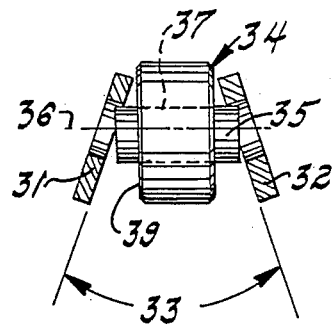
FIG. 6 is an end elevational view of the strip sheet stock section after having been subjected to a partial bending operation.

Referring now to FIGS. 3, 6, 8, 9 and 12, the bending operation is carried out in two parts, the first of which is to partially bend the strip sheet stock section along the embossed grooves 18 and 19 to form a partially bent channel 30, as shown in FIG. 6, the channel having side walls 31 and 32 and an included angle 33 of no greater than 40°. Angle 33 is the angle between the side walls of the channel. In the partially bent condition, a journalized wear assembly 34 (roller bearing assembly) is inserted with its journal (pin shaft 35) extending into the opposed journal openings 13 and 14 which approach alignment on a common axis 36. The wear assembly 34 may use needle bearings 37 arranged concentrically about the pin shaft 35, for supporting a roller 39 for increasing the low friction characteristic of the assembly.

Secondly, additional bending is carried out with the wear assembly 35 in place to move the channel side walls 31 and 32 to be substantially parallel (may require bending to an angle of at least 95° with respect to the axis 36 to compensate for spring-back of such medium carbon steel material). In the final configuration, the channel side walls will make an angle of substantially 90° with axis 36. Subsequently, the ends 35a of such bearing assembly pin shaft 35 are upset at 38 during such bending operation to lock the ends 35a in place on the rocker arm. The upsetting operation can be conveniently carried out by applying an axial force to the outer ends of the pin shaft 35, causing them to expand to a degree larger than the diameter of the journal openings 13 and 14.

The time sequence for carrying out the stamping, shaping, hardening and bending operations have been measured to be in the time frame of 4-10 minutes. This is considerably faster than comparative methods of making such stamped metal rocker arms which typically have a time period of several hours. With such rapid sequence of making, the concepts of "just in time" inventory control can be employed for the first time with this particular article.

The construction resulting from the above method is a low friction finger-follower rocker arm that comprises: (a) a metal channel formed from flat stock, the channel having a web 42 and side walls 31,32 depending therefrom to define a U-shaped cross-section, the side walls having surfaces defining transversely aligned openings 13,14, and said web having integral wear surfaces 20,22 at opposite ends thereof, the wear and opening surfaces being defined in the flat stock prior to the formation of the channel; and (b) low friction roller assembly 34 journalled in the opening surfaces. The wear surfaces are defined by coining and laser hardening, and the flat stock is advantageously comprised of annealed and cold-rolled medium carbon steel.

While particular embodiments of the invention have been illustrated and described, it will be noted by one skilled in the art that various changes and modifications may be made without departing from the invention, and it is intended to cover in the appended claims all such modifications and equivalents as fall within the true spirit and scope of the invention.

We claim:

1. A method of making a low friction finger follower rocker arm from a substantially flat strip sheet stock section having a configuration with a centralized opening, comprising the steps of:
    (a) while in said substantially flat condition (i) shaping the strip sheet stock section to have a pair of journal openings disposed on opposite sides of said centralized opening, a pivot surface at one end of the strip sheet stock section, a stud contacting surface at the other end of the strip sheet stock section, and a pair of grooves aligned with the extremities of said centralized opening and containing said surfaces therebetween, and (ii) locally hardening the surfaces and the edges of said opposed openings;

(b) bending said strip sheet stock section along said grooves to form a partial channel having side walls with an included angle of no greater than 40° and with said journal openings approaching alignment on a common axis; and (c) inserting a journalized low friction wear assembly with its journals in said opposed journal openings, and then completing the bending of said strip sheet stock section so that the sides of the channel are substantially parallel and locking said wear assembly journals to said channel side walls.

2. The method as in claim 1, in which said strip sheet stock section is comprised of medium carbon steel which has been annealed and cold-rolled.

3. The method as in claim 2, in which the thickness of said strip sheet stock section is in the range of 0.100–0.250 inches.

4. The method as in claim 1, in which said shaping operation of step (a) (i) is carried out by piercing of said openings simultaneously with identing the edges of said opposed journal openings.

5. The method as in claim 4, in which the shaping operation of step (a) (i) for defining the grooves is by embossing and the radius of said embossed groove is in the range of 0.010–0.050 inches.

6. The method as in claim 4, in which said shaping operation of step (a) (i) for defining said pivot surface and the stud contacting surface is by coining.

7. The method as in claim 1, in which said localized hardening step (a) (ii) is carried out by laser hardening.

8. The method as in claim 1, in which the low friction wear resistant assembly is comprised of a roller bearing assembly having a pin shaft providing said journals.

9. The method as in claim 8, in which the bearings of said wear resistant assembly are needle bearings.

10. The method as in claim 1, in which said locking of the pin shaft in step (c) is carried out by an upsetting operation.

* * * * *